3,554,830
PRODUCTION OF GRAPHITE BODIES
Harry L. Riley, Wolvercote, Oxford, and Peter H. Pinchbeck, Chesterfield, England, assignors to United Coke & Chemicals Company Limited, Treeton, near Rotherham, Yorkshire, England, a British company
Filed Dec. 6, 1966, Ser. No. 599,537
Claims priority, application Great Britain, Dec. 8, 1965, 52,099/65
Int. Cl. B32b 31/26
U.S. Cl. 156—167          6 Claims

ABSTRACT OF THE DISCLOSURE

Graphite electrodes and similar bodies are made by assembling extruded lengths of green carbonaceous masses in lengthwise contact to form the green bodies which are baked and graphitized.

---

Figure 1:
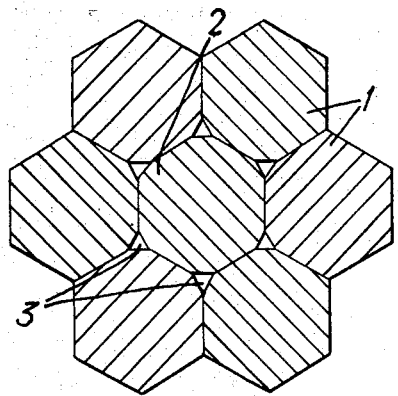

This invention relates to the production of graphite articles of substantially uniform cross-section throughout their length. It is particularly applicable to electrodes of arc furnaces for steel production, but may also be applied, for example, to refractory blocks of graphite.

It is well known to produce such graphite articles by a series of steps, in the first of which a green body of amorphous carbon such as coke grist and a binder such as coal tar pitch is formed into appropriate section shapes and sizes by extrusion. The green extrusion is next baked slowly to carbonise the binder without disrupting the body by the rapid evolution of volatile matter, and then is graphitized by heating at a high temperature.

The mechanical strength of graphite produced in this way decreases as the cross-sectional size of the extrusion increases. The reason is that differential flow occurs across the section during the extrusion process, and the greater the difference in flow the greater is the decrease in strength. To minimize this loss of strength it is the usual practice to incorporate large coke grists in the green bodies, these grists increasing in size as the cross-sectional size of the extrusion increases. Coke grists as large as ½" or ¾" are incorporated in extrusions 24 inches in diameter. However, these large pieces of grist, while reducing the loss of strength that results from differential flow and improving the ease of evolution of volatile matter, are in turn a source of weakness in the graphitized body. Recent strength measurements given by Morelli & Rusinko (Chemical Engineering 1963, 70, 69) show that the flexural strength of electrodes 2½ inches in diameter is over six times greater than that of electrodes of diameter greater than 16 inches.

This relative weakness in large graphite electrodes is the cause of many electrode breakages during use in arc furnaces.

According to the invention we assemble extruded green lengths of relatively small cross-section in lengthwise contact with one another into a composite green body, and bake and graphitize this. We find that in this way we can make much stronger electrodes of relatively large cross-section. The green lengths must of course be formed into an assembly which can be handled. They have some mechanical strength and are preferably mechanically secured together, for example, by being put in a two-part jig or frame of metal strip, the two parts of the jig or frame being held together by bolts or otherwise when the lengths are in position. They may alternatively be united by a resin or similar adhesive. Even without an adhesive, they adhere firmly together during the baking.

The extruded lengths may be of any convenient shape having regard to the cross-section of the final electrode. They need not all be of the same cross-sectional shape or size.

The extruded lengths are preferably each about 2 inches or less in transverse dimension. They can be built into composite bodies of any desired size.

The green material is preferably fine-grained, advantageously being made with coke grist of particle size not exceeding 2 mm. When a fine-grained material has been used in the past and extruded to large sectional size, the evolution of volatile matter during the baking step has caused disruption, which has been an additional reason for the use of a coarse-grained material to minimise the risk of such disruption during baking. In the present invention we prefer to assemble the extruded lengths with one or more small gaps between adjacent lengths so that longitudinal passages are formed in the body throughout its length and facilitate the evolution of volatile matter during the baking stage.

In the accompanying drawings each of the figures is a cross-section through a composite green body.

FIG. 1 shows a body composed of six substantially hexagonal lengths 1 each lacking two corners, and a central substantially hexagonal length 2 lacking any corners. It will be seen that in the assembly gaps 3 are formed where the corners are missing.

Figure 2:
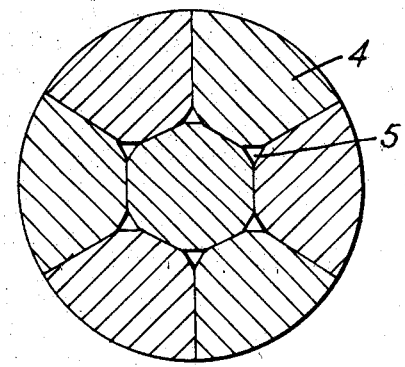

FIG. 2 shows a modified assembly including a length 1 such as that shown in FIG. 1 and lengths 4 of different shape, these lengths 4 serving to render the resultant electrode substantially circular in cross-section. This is desirable when the electrode should pass through a circular opening into a steel furnace with only little clearance in order to minimize the escape of gases from the furnace. It will be seen that the lengths 4 are shaped so that additional longitudinal passages 5 are formed for the escape of volatile matter during the baking.

Figure 3:
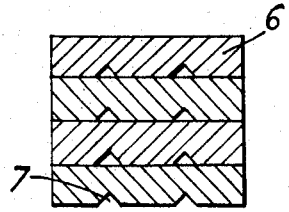

FIG. 3 shows a body of rectagular cross-section composed of four rectangular lengths 6 each of which has been formed with two notches 7 in the extrusion process so as to form longitudinal passages.

Any of the lengths shown can easily be produced with the use of an appropriate die in the extrusion press.

In the application of the invention to electrodes for steel furnaces, the extruded green mass may advantageously include iron and ferro-silicon as described in U.S. Patent No. 3,309,326 of H. L. Riley filed Feb. 18, 1964.

We claim:
1. In the manufacture of a graphite article of substantially uniform cross-section throughout its length by extruding a green mass of amorphous carbon and a binder, baking the resultant green body to carbonize the binder and graphitizing the baked body by heating at high temperature, the improvement which comprises assembling a plurality of extruded green lengths of relatively small cross-section in lengthwise contact with one another and thereafter baking the assembled extruded green lengths to carbonize the binder and graphitizing the baked body by heating at high temperature to provide a graphite article of substantially uniform cross-section throughout its length, whereby said assembled lengths are bonded together by bonds formed during said baking and said graphitizing.

2. The manufacture of an article according to claim 1 in which the amorphous carbon is coke grist of particle size not exceeding 2 mm.

3. The manufacture of an article according to claim 1 in which the extruded lengths are assembled with small gaps between adjacent lengths so that longitudinal passages are formed in the body.

4. The manufacture of an article according to claim 1 in which each extruded length is no more than 2 inches in transverse dimension.

5. The manufacture of an article according to claim 1 in which the article is substantially circular in cross-section, whereby there results an electrode for a steel furnace.

6. The manufacture of a graphite electrode according to claim 1 in which the green mass also contains iron and ferro silicon.

References Cited
UNITED STATES PATENTS

| | | | |
|---|---|---|---|
| 1,313,126 | 8/1919 | Shoeld | 313—357X |
| 3,309,326 | 3/1967 | Riley et al. | 252—503 |

CARL D. QUARFORTH, Primary Examiner

S. HELLMAN, Assistant Examiner

U.S. Cl. X.R.

252—502; 264—58; 313—357